United States Patent
Boskovic (10) Patent No.: US 9,239,744 B2
(45) Date of Patent: Jan. 19, 2016

(54) HYBRID OBJECTS (71) Applicant: Srdjan Boskovic, Heidelberg (DE)

(72) Inventor: Srdjan Boskovic, Heidelberg (DE)

(73) Assignee: SAP SE, Walldorf (DE)

(*) Notice: Subject to any disclaimer, the term of this patent is extended or adjusted under 35 U.S.C. 154(b) by 384 days.

(21) Appl. No.: 13/693,807

(22) Filed: Dec. 4, 2012

(65) Prior Publication Data
US 2014/0156786 A1   Jun. 5, 2014

(51) Int. Cl.
G06F 15/16 (2006.01)
G06F 9/54 (2006.01)
G06Q 10/06 (2012.01)

(52) U.S. Cl.
CPC ............... *G06F 9/547* (2013.01); *G06F 9/541* (2013.01); *G06Q 10/0631* (2013.01)

(58) Field of Classification Search
CPC ............. H04L 29/08072; H04L 29/06; H04L 29/0809
USPC ........................................................ 709/217
See application file for complete search history.

(56) References Cited

U.S. PATENT DOCUMENTS

| | | | |
|---|---|---|---|
| 2002/0054170 A1* | 5/2002 | Rush et al. ..................... | 345/854 |
| 2003/0084203 A1 | 5/2003 | Yoshida et al. | |
| 2004/0163037 A1 | 8/2004 | Friedman et al. | |
| 2005/0289202 A1 | 12/2005 | Sudhir et al. | |
| 2007/0055781 A1* | 3/2007 | Fleischer et al. .............. | 709/227 |
| 2008/0082539 A1 | 4/2008 | Doane | |
| 2009/0157629 A1 | 6/2009 | Gutlapalli et al. | |
| 2009/0313644 A1 | 12/2009 | Klets et al. | |
| 2010/0269047 A1 | 10/2010 | Pahlavan et al. | |
| 2011/0145893 A1 | 6/2011 | Tock et al. | |
| 2011/0202377 A1 | 8/2011 | Maiya et al. | |
| 2011/0282969 A1 | 11/2011 | Iyer et al. | |
| 2012/0096384 A1 | 4/2012 | Albert et al. | |
| 2012/0215894 A1 | 8/2012 | Zheng et al. | |
| 2013/0159379 A1 | 6/2013 | Boskovic | |

OTHER PUBLICATIONS

"U.S. Appl. No. 13/327,060, Final Office Action mailed Aug. 29, 2014", 25 pgs.
"U.S. Appl. No. 13/327,060, Non Final Office Action mailed Apr. 10, 2015", 27 pgs.
"U.S. Appl. No. 13/327,060, Non Final Office Action mailed May 15, 2014", 22 pgs.
"U.S. Appl. No. 13/327,060, Response filed Aug. 14, 2014 to Non Final Office Action mailed May 15, 2014", 14 pgs.
"U.S. Appl. No. 13/327,060, Response filed Dec. 18, 2014 to Final Office Action mailed Aug. 29, 2014", 11 pgs.

* cited by examiner

*Primary Examiner* — Chris Parry
*Assistant Examiner* — Alan S Chou
(74) *Attorney, Agent, or Firm* — Schwegman Lundberg & Woessner, P.A.

(57) ABSTRACT

Embodiments illustrated and described herein provide systems, methods, and software of a system platform that enables apps, applications, processes and the like with functionality and data present in an enterprise-class computing system, such as an Enterprise Resource Planning system. Some such embodiments include a hybrid object that exists in part within a web infrastructure and in part within the enterprise-class computing system. The portion of the hybrid object in the web infrastructure exposes resources of the enterprise-class computing system outside of the enterprise-class computing system to be accessible by apps and other data processing assets. These and other embodiments are illustrated and described herein.

14 Claims, 6 Drawing Sheets

HYBRID OBJECTS

BACKGROUND INFORMATION

Modern enterprise-class computing systems, such as Enterprise Resource Planning (ERP) systems, are highly capable of performing processing functions for many organizations. However, for many different reasons user interaction with such systems has generally required users to at least be connected to a particular network or utilize a thick-client application. Thus, despite the modem-nature of enterprise-class computing systems, users have not been able to interact with these systems according to modem application delivery models, such as through apps delivered via one or both of a web browser and device apps, such as an app that executes on a smartphone-type device.

However, even when users are able to interact with such enterprise-class computing systems, functionality is delivered at the client-level, whether that is through a web browser, a thick client application, or device app. This has resulted in a duplication of functionality that previously existed in a backend portion of the enterprise-class system. Such duplication is also compounded when the functionality is delivered to multiple client-types. Duplication of functionality is expensive and time consuming not only in development, but also in maintenance as anytime a functional change or fix is made, the functional change or fix must be replicated and deployed for each supported client-type.

DETAILED DESCRIPTION

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims.

The functions or algorithms described herein are implemented in hardware, software or a combination of software and hardware in one embodiment. The software comprises computer executable instructions stored on computer readable media such as memory or other type of storage devices. Further, described functions may correspond to modules, which may be software, hardware, firmware, or any combination thereof. Multiple functions are performed in one or more modules as desired, and the embodiments described are merely examples. The software is executed on a digital signal processor, ASIC, microprocessor, or other type of processor operating on a system, such as a personal computer, server, a router, or other device capable of processing data including network interconnection devices.

Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

Concepts like "apps" or "appstore" are today closely related to mobile apps and devices. Apps are light, fast, intuitive, and nice. Modem enterprise-class computing systems, such as Enterprise Resource Planning (ERP) systems, can be viewed as the opposite of apps, often being rigid, monolithic, and cryptic. Much of the functional value of such enterprise-class computing systems is often in the business logic implemented therein. However, the delivery of the functional value in such enterprise-class computing systems does not meet modern standards of rich user experiences, as typically provided by apps, and are often tethered exclusively to specific desktop platforms. As a result, the backend of enterprise-class computing systems has become more of a database that is accessed by apps and applications deployed according to more modern standards.

Various embodiments illustrated and described herein provide a platform for fast, scalable, and flexible delivery of the enterprise-class computing system functional value to virtually any device, through native device and browser-based apps and other client applications while allowing rich user experiences with high performance. Such apps are provided through unification with an architecture of an enterprise-class computing system to enable delivery and enhancement of functionality at the level of mobile devices, web browsers, and client applications. These embodiments enable new solutions and greater organizational and user flexibility through use of hybrid objects that reside in part in a web platform layer and in part in the enterprise class computing system.

Hybrid objects are utilized to leverage functionality and data that already exists within enterprise-class computing systems, such as an ERP system, without requiring replication of the underlying logic and data upon which the logic relies. Hybrid objects leverage existing functionality and data through bifurcation of objects present in a computing environment, such as an enterprise-class computing system, to allow client interaction via a delivery object portion residing in a web platform layer that communicates with a server-side object portion residing in an enterprise-class computing system according to a defined protocol. The delivery object portion exposes functions or methods to be called on a client-side and communicates with the server-side object portion deployed in the enterprise-class computing system that allows the server-side object portion to either directly or indirectly access data and call functions or methods exposed within a backend of the enterprise-class computing system. A delivery object portion does not replicate the functionality and data of the enterprise-class computing system, but instead provides a fast conduit through which apps are able to access the functionality and data of the enterprise-class computing system. In some such embodiments, a single server-side object portion may be accessed by different delivery object portions that are tailored to specific clients that leverage functionality and data of the enterprise-class computing system.

Such hybrid object solutions leverage an enterprise-class computing system backend, which persists data and logic, as well as user interface definitions in some embodiments. Such embodiments are generally built upon a web framework to deliver at least one of functionality, data, and user interface definitions to apps, browser-based applications, and thick client applications. Example embodiments of some such solutions are illustrated and described with regard to FIG. 1, FIG. 2 and FIG. 3.

Figure 1:
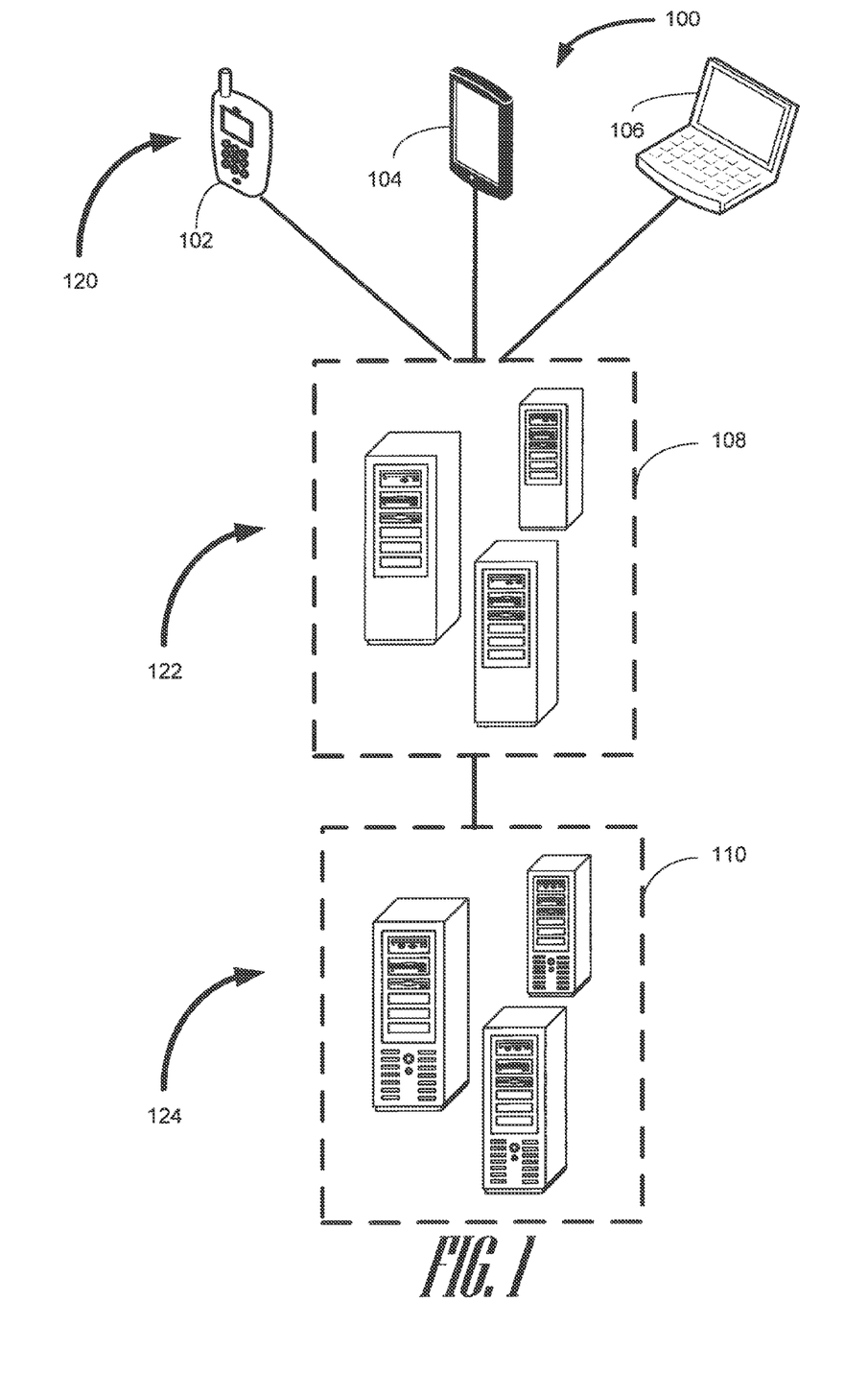
FIG. 1 is a diagram of a system, according to an example embodiment.

FIG. 1 is a diagram of a system 100, according to an example embodiment. The system 100 is an example of how computing devices in some embodiments may be implemented. While specific device types and numbers thereof may be illustrated and described, these devices types and the numbers of these device types are provided only as an example and other device types and numbers of device types may be chosen and implemented in other embodiments.

The system 100 generally includes three layers of devices. These layers include a delivery layer 120, a web platform layer 122, and an enterprise layer 124.

The delivery layer 120 includes various computing devices 102, 104, 106 upon which apps may be delivered according to the various embodiments herein. The various computing devices 102, 104, 106 may include a smartphone 102, a tablet 104, and a personal computer 106 (i.e., laptop, desktop, etc.). Other device types may include set top boxes; web-enabled televisions; a smart, web-enabled console of an automobile; an optical disk player (i.e., DVD player, Blu-ray player); and other device-types that currently or may in the future be enabled for apps that are either native device apps or apps that may operate within a web browser.

The web platform layer 122 may include one or more computing devices connected to a network, such as the Internet, over which the web platform layer 122 may communicate with devices in the delivery layer 120. The web platform layer 122 also communicates with devices in the enterprise layer 124 over a network, which may be the same network over which the web platform layer 122 communicates with the delivery layer 120 or a different network, such as one or more of a system area network, a local area network, and other network types.

The web platform layer 122 typically includes at least one computing device 108 upon which a web server and an application framework execute to receive, process, and fulfill data requests from devices in the delivery layer 120. As is readily apparent to a person of skill in the art, the web platform layer 122 may include many computing devices that may be co-located or distributed in multiple locations, but operate in conjunction with one another to load balance, enhance security and reliability, and meet demand needs with low latency.

The enterprise layer 124 is representative of one or more enterprise-class computing systems, such as an ERP system, for example an ERP system available from SAP AG of Waldorf, Germany. ERP systems operate on at least one computing device 110, but in many instances, an ERP system may operate on many computing devices 110. ERP systems generally integrate management functions of an organization, often including modules for accounting, finance, customer relationship management, manufacturing, sales, service, and other business functions. ERP systems persist data in databases and provide functionality and data processing capabilities throughout an organization. User interaction with ERP systems is often through thick-client applications. Some ERP systems provide abilities for users to interact with the system through web pages. However, ERP systems that allow interaction via web pages are typically provided via a hosted, Software-as-a-Service model and are entirely web-based and are not operated nor maintained by the organization the web-based ERP solution is supporting.

The web platform layer 122 provides abilities to organizations utilizing an ERP system that are hosted or they self-host to deliver ERP system functionality to native device apps and web browsers, and even some think-client applications. The web platform layer 122 bridges the two different computing worlds and sophisticated architectural makeups of ERP systems and web solutions. Through connector and mapper objects within the web platform layer 122, data, user interface definitions, and functionality are transformed to enable apps in the delivery layer to provide rich user experiences with regard to the functionality embedded within the enterprise layer 124.

In various embodiments illustrated and described herein, devices 102, 104, 106 in the delivery layer 120 access data and functionality included in the enterprise layer 124 via hybrid objects. Hybrid objects reside in part in the web platform layer 122 and reside in part in the enterprise layer 124. The devices 102, 104, 106 in the delivery layer 120, when needing access to data and functionality of the enterprise layer 124, call a delivery object portion of a hybrid object in the web platform layer 122. The call of the delivery object portion in the web platform layer 122 by from the delivery layer 120, in some embodiments, is encoded according to a protocol to allow the delivery object portion to forward the hybrid object call with little or no additional processing to the server-side object portion in the enterprise layer 124. The server-side object portion in the enterprise layer 124, upon receipt of the hybrid object call is then able to access functionality and data present in the enterprise layer 124, which is generally not accessible directly by apps in the delivery layer 120. The hybrid object call is processed accordingly in the enterprise layer 124 and any needed responses thereto are encoded by the server-side object portion and sent to the delivery object portion in the web platform layer 122 and returned to the calling app in the delivery layer 120. Through utilization of delivery object portions of a hybrid object that also includes a server-side object portion in the enterprise layer 124, functionality and data that was previously not accessible in the delivery layer can be quickly accessed. Such solutions relieve app developers from replicating enterprise layer 124 functionality and simplify maintenance of that functionality and data, as the maintenance typically does not need to be replicated to the delivery layer 120 or the web platform layer 122.

Figure 2:
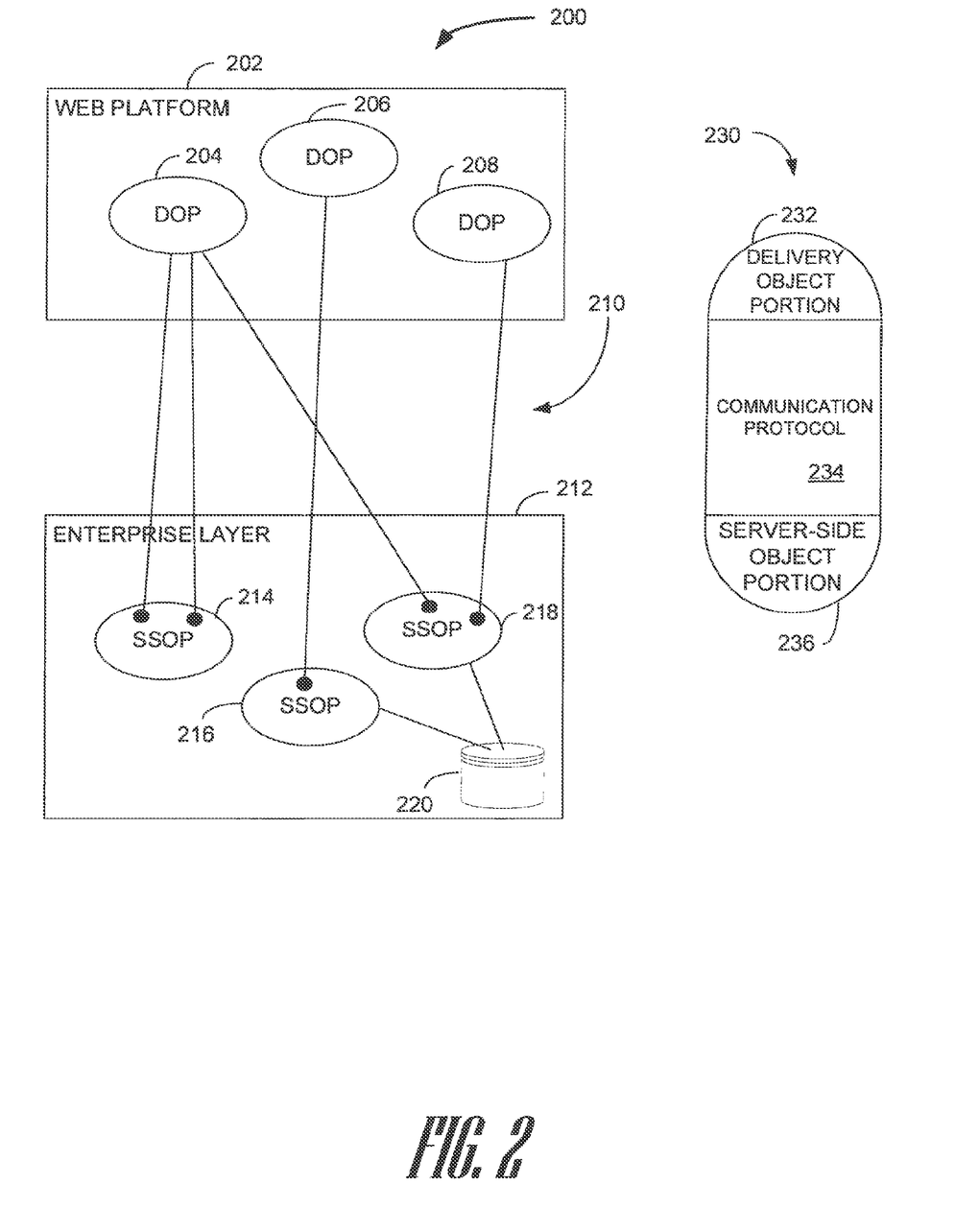
FIG. 2 is a hybrid object and hybrid object deployment illustration according to an example embodiment.

FIG. 2 is a hybrid object 230 and hybrid object deployment illustration 200 according to an example embodiment. In particular, FIG. 2 illustrates a hybrid object 230 example that is deployed in two portions 232, 236 that are connected by a communication protocol 234. The two portions include a delivery object portion (DOP) 232 and a server-side object portion (SSOP) 236. The DOP 232 is deployed at the web platform layer, such as within a web platform 202. The SSOP 236 is deployed within an enterprise layer 212. The DOP 232 and SSOP 236 are connected according to a communication protocol over which they are able to communicate with one another, which may leverage an existing communication infrastructure within a computing environment, such as is illustrated and described below with regard to FIG. 3.

The DOP 232 exposes functionality and data of the enterprise layer 212 at the web platform layer 202 which is callable by apps, applications, and other processes within the web platform 202 or that can access the web platform 202 via a network, such as the Internet. When a an app, application, or other process desires a function or data of the hybrid object 230, the DOP 232 receives a request from the app, for example, and communicates with the SSOP 236 via the communication protocol 234 to fulfill the request. The data and functionality are actually obtained or performed in the enterprise layer 212, but a result is also provided to the app via the DOP 232.

The hybrid object deployment illustration 200 includes a web platform 202 and an enterprise layer 212. The web platform 202, as mentioned above, receives hybrid object 230 calls from an app, such as may be a device app that executes on a mobile device, a personal computer, a web-application delivery platform accessible by users via a web browser, and the like. The enterprise layer 212 represents an enterprise-class application or application suite, such as an ERP application.

The enterprise layer 212 includes objects that implement logic and provide access to data, such as data stored in a database 220. The objects in the enterprise layer 212 are generally not directly accessible outside of the enterprise layer 212. However, the enterprise layer 212 typically includes interfaces though which communications may be received and transmitted. Some such communications may be remote function calls, although other types of communications may be received in some embodiments. Thus, the enterprise layer 212 according to the illustrated embodiment of FIG. 2 includes SSOPs 214, 216, 218 that have functions, or methods, that are accessible via one or more communication interfaces, such as an interface capable of receiving and responding to remote function calls. The SSOPs 214, 216, 218 are executable code elements within the enterprise layer 212, written in an appropriate compiled or scripting programming language to be executable within the enterprise layer 212. The SSOPs 214, 216, 218 execute to perform data processing activities within the enterprise layer 212 to fulfill requests originating elsewhere, such as in an app 202, and flowing to the SSOPs 214, 216, 218 in the enterprise layer 212 via the DOPs 204, 206, 208 in the web platform 202.

The DOPs 204, 206, 208 expose data processing capabilities of the enterprise layer 212 via a network to allow apps, for example, to call methods or functions of their respective hybrid objects 230. The DOPs 204, 206, 208 receive data processing requests from the app 202 and communicate those requests to the SSOPs 214, 216, 218 in the enterprise layer 212. This offloads processing and data storage needs to the enterprise layer 212 from the app. This also simplifies development and maintenance of the app 202 as the data and functionality present in the enterprise layer 212 need not be replicated to the app 202.

Figure 3:
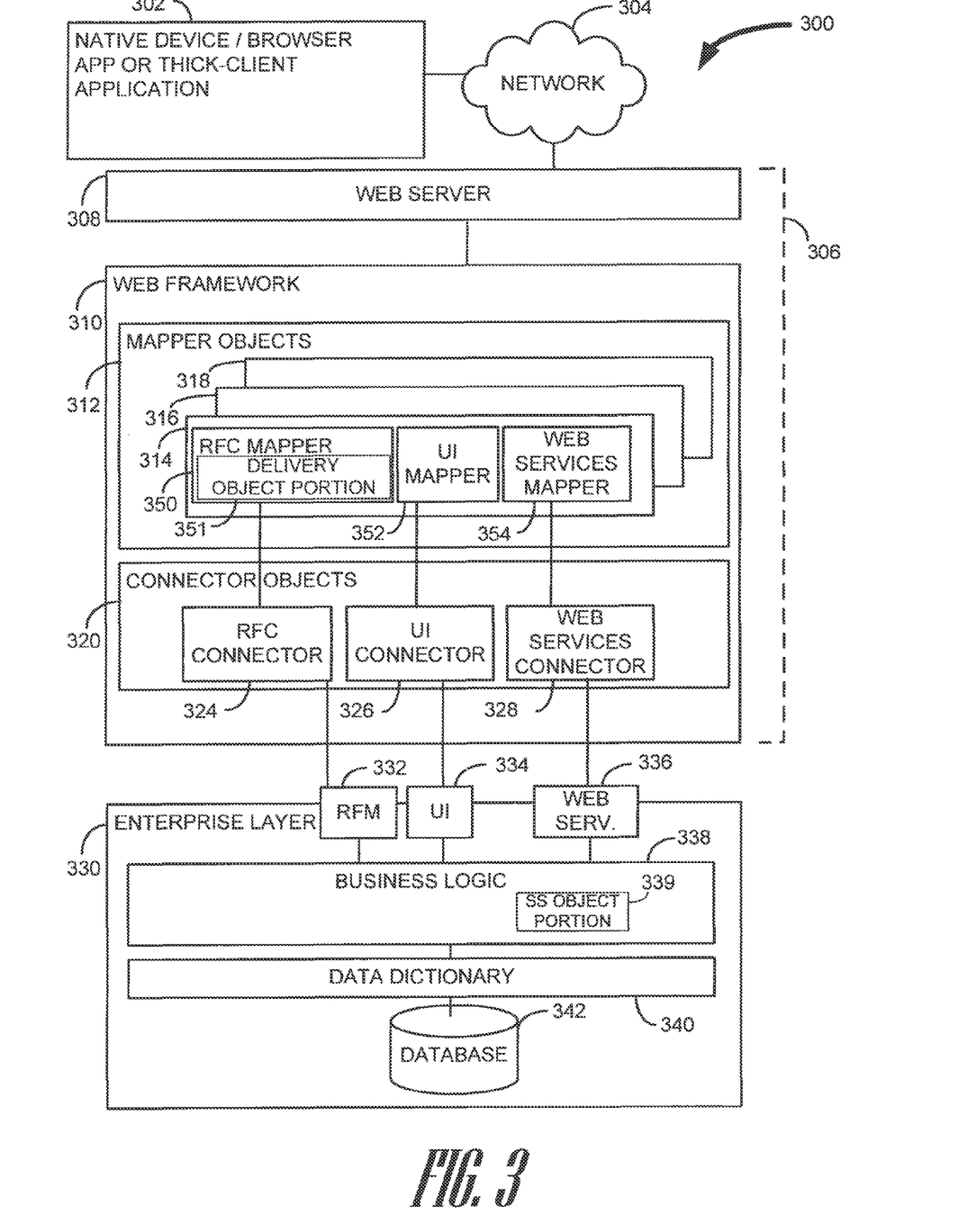
FIG. 3 is a logical diagram of a system, according to an example embodiment.

FIG. 3 is a logical diagram of a system 300, according to an example embodiment. The system 300 operates to provide functionality of an application of an enterprise layer 330 in an app 302 that executes on a device, such as one of the devices 102, 104, 106 of FIG. 1. The system 300 provides an example embodiment including the use of a hybrid object as illustrated with regard to the delivery object portion (DOP) 351 and the server-side object portion (SSOP) 339.

The app 302 communicates with a web server 308 over a network 304, such as the Internet and may include one or both of a wireless computer network and 3G or 4G wireless network connection. The web server 308 is one element of a web platform layer 306 of the system 300. The web platform layer 306 also includes a web framework 310, which in some contexts is referred to as a web application framework or an application server. Objects execute within the web framework 310 to communicate with an application, such as an enterprise-class computing system that executes in an enterprise layer 330.

In the illustrated embodiment of FIG. 3, the app 302 is a client application providing user accessible data processing functionality. The functionality provided by the app 302 may include functionality implemented in the app 302 itself, but at least some functionality is instead implemented in the enterprise layer 330 and is accessed by the app 302 via a hybrid object that includes a DOP 351 in the web framework 310 and a SSOP 339 in the enterprise layer. The DOP 351 exposes functions or methods to the app 302 implemented functionally within the enterprise layer 330. The DOP 351 exposes methods accessible over a network to the app 302 to allow the app 302 to access functionality, and even data, of the enterprise layer 330. This provides app 302 developers a streamlined way in which to develop the app 302. Rather than replicating functionality and data that already exists in the enterprise layer 330, the app 302 developer can focus on app-specific functionality and user interaction. Further, maintenance of the app 302 becomes easier as many functionality and data changes can be implemented in the enterprise layer 330 without having to redeploy the app 302. The app 302 in such embodiments can also be a smaller entity for storing on a particular device and will typically consume fewer device computing resources when executed.

The DOP 351 of a hybrid object may be developed in a computer coding language such as Python™, in either a compiled or scripting context, or another compiled or script language compatible with the web framework 310. While a single DOP 351 is illustrated, multiple such DOPs 351 may exist in different embodiment to interact with different portions, functions, and data of the enterprise layer 330, different apps or device-type specific apps, and other computing environments. Further, the DOP 351 may take different forms depending on a particular web framework 310 upon which the DOP 351 is deployed. Thus, a DOP 351 may be specific to device-types from one manufacturer or device operating system and device-types of another manufacturer or device operating system may have a different DOP 351, although the different DOPs 351 may access enterprise layer 330 functionality and data via the same SSOP 339.

The DOP 351 is typically called from the app 302 and the call is carried via a network to the DOP 351. The DOP 351 then communicates with the server-side object portion 339 via interfaces of the web framework 310 and the enterprise layer 330 to relay data and messages between the DOP 351 and the SSOP 339 of a hybrid object.

The web server 308 is generally a software application that operates to receive, process, and respond to data requests received via the network from the app 302. The web server 308, in some embodiments, may be an NGINX™ web server. However, in other embodiments the web server may be of a different type, such as an Apache web server. The web server 308 may retrieve data, including content, in response to received requests or redirect requests to another network location capable of servicing the request. In some embodiments, the web server 308 communicates via a Web Server Gateway Interface (WSGI) with the web framework 310, or other interface depending on the particular type of the web framework 310, to route requests to different objects and DOPs 351 that execute within the web framework 310. Requests are typically routed by the web server 308 based on a Universal Resource Identifier (URI), such as a Universal Resource Locator (URL), or routing data included in a request.

The web framework 310 is generally a software framework within which other computer code, compiled or scripting code, can execute. The web framework 310 typically includes existing facilities leveraged by objects that execute therein to access databases, templates, content of various types, to access functions commonly used by objects, object portions, and other facilities. The web framework 310 may also perform other functions such as session management, caching, providing at least one interface such as a WSGI interface for receiving and making requests of other system 300 elements, and other ancillary services. The web framework 310, in some embodiments may be a Pyramid web framework, but other web frameworks are utilized in other embodiments, such as Python™ web frameworks Zope and Django®, Ruby programming language web framework Ruby on Rails' (RoR), and other competing frameworks. Objects that execute within the web framework 310 are typically accessed via the WSGI interface of the web framework 310 by the web server 308, and in some instances by a process in an enterprise layer 330.

The enterprise layer 330 generally represents an enterprise-class computing system, such as an ERP system. An example ERP system, such as an ERP system available from SAP AG of Waldorf, Germany, includes business logic 338 executable to perform activities including creating, reading, updating and deleting data stored in one or more databases 342. Some such systems may utilize a data dictionary 340 that informs various elements of the enterprise layer 330 about data stored in the one or more databases 342 about meaning, data relationships, formats, usage, dependencies, primary and secondary sources of the data, storage locations, and other information about data stored in the one or more databases 342. The business logic 338 may not only receive data and command input, but also may provide data output and user interface information to requestors.

The business logic 338 resources of the enterprise layer 330 are generally not directly accessible outside of the enterprise layer. However, to expose the business logic 338 resources to apps, such as app 302, one or more server-side object portions 339 are provided. The SSOP 339 exposes one or more of the business logic 338 resources to the app 302 as a portion of a hybrid object. The app 302 makes calls of and receives output and data of the methods, functions, and data of the business logic 338 via one or more DOPs 351 within the web framework 310. The DOP 351 receives calls of methods, functions, and data from the app 302 and relays those calls to the SSOP 339. The SSOP 339 is then able to call and access other objects within the enterprise layer 330 to provide desired functionality and data to the app 302, as relayed back to the app 302 via the DOP 351. The DOP 351 and the server-side object portion 339 thereby together form a single hybrid object where a portion of the hybrid object resides in the web framework 310 and the other portion resides in the enterprise layer 330. In some embodiments, the business logic 338 may also push data to the app 302 via server-side object portion 339 and the DOP 351.

Within the enterprise layer 330, input is received and output is provided via one or more interfaces 332, 334, 336. The interfaces 332, 334, 336 each typically communicate data in distinct forms from one another. Although three interfaces 332, 334, 336 are illustrated and described, other embodiments may include fewer, more, and different interfaces according to different communication protocol and data specifications.

Interface 332, in some embodiments, is a remote function module that exists to exchange remote function calls. The interface 332 may communicate remote function calls and responses via TCP/IP, HTTP(S), or other protocol with the data encoded according to a proprietary remote function standard, XML, or other data-encoding standard.

Interface 334 may be a user interface module that exists to receive and respond to requests for user interface definitions from which user interfaces are generated. For example, some ERP systems provide client application user interface definitions, which are consumed by client applications to present user interfaces for presenting data and receiving input. Such user interface data may be communicated via the interface 334 via a protocol such as HTTP(s) encoded according to one or more of several data formats. User interface data transmitted via the interface 334 may, in some embodiments, also include application data. The data formats of the interface 334 may be text, HTML, XML, Java Script Object Notation (JSON), or other lightweight text-based open standard design tailored for human-readable data interchange.

Interface 336 is a web services interface that receives and provides web service functionality and data. The interface 336 may communicate via HTTP(S) or other suitable protocol depending on the particular embodiment. Data received and communicated via the interface 336 may be encoded according to a standard, such as XML, Simple Object Access Protocol, or other standard.

Conventionally, the interfaces 332, 334, 336 have been utilized to facilitate enterprise layer 330 communication directly with client applications in a standard, client-server type architecture. Client applications directly access data, make remote function calls, and access web services. However, such client applications do not provide the flexibility, rich user experiences, and mobility expected by modern application users. Further, such client applications, in particular modern mobile applications and web-accessible/-deliverable applications, require replication of enterprise layer 330 functionality and data in one or both of the client applications and in the web framework 310. Thus, to facilitate the app 302 providing the type of experience users expect in modern computing and with the functionality of an enterprise-class computing system while also reducing the amount of functionality and data replication needed, embodiments include hybrid objects that expose functionality to the apps by providing a communication route between apps and the enterprise layer. Such embodiments split the communication tasks between the app 302, web framework 310, and the enterprise layer 330 through implementation of a hybrid object, for example the DOP 351 that bridges communication between the app 302 and the enterprise layer 330 via the SSOP 339, the DOP 351 and the SSOP 339 together forming the hybrid object. Such hybrid object portions are not stand-alone objects because they are not developed to operate individually. Instead, the DOP 351 provides app 302 interaction with the hybrid object, while the server-side object portion 339 provides enterprise layer 330 interaction. The server-side object portion 339 and the DOP 351 communicate via a set protocol to form a linkage between the hybrid objet portions.

Mapper objects 312 include groups 314, 316, 318 of mapper objects for each app 302 supported by the system 300. Each app 302 supported by the system 300 is an app that may operate on multiple different device and browser platforms, but in the sense of the system 300 is a single supported app. For example, the app 302 may execute on multiple smartphone device types, multiple tablet device types, and within multiple browser types that support apps or are otherwise capable of executing app code elements within the browser, such as an applet. Thus, as illustrated in FIG. 3, the system 300 supports multiple apps 302 and each app 302 is supported by a respective group 314, 316, 318 of mapper objects 312.

In some embodiments, each group 314, 316, 318 of mapper objects 312 includes a mapper object for each type of connector object 320 that exists in the system 300. The connector objects 320, in some embodiments, include a connector object for each of the interfaces 332, 334, 336 within the enterprise layer 330. Thus, as illustrated in FIG. 3, the system 300 supports three different apps due to the three groups 314, 316, 318 of mapper objects 312. Each group 314, 316, 318 of mapper objects 312 includes an object, such as mapper objects 350, 352, 354, for each respective connector object 324, 326, 328. Each connector object 324, 326, 328 also has a respective enterprise layer 330 interface 332, 334, 336.

Mapper objects 312 execute to process data requests forwarded by the web server 308 and data received from connector objects 320. The web server 308 or a process of the web framework 310 selects an appropriate mapper object 312, to receive the request based on at least one of an app from which the data request was received and a data interchange protocol the request is encoded in. For example, in some embodiments and as illustrated in FIG. 3, mapper objects 312 include groups 314, 316, 318 of mapper objects where each group is implemented with regard to a particular app. Thus, when a request is received, the request is routed to a mapper object in the mapper object group of the app from which the request was received. For example, if the request is encoded in HTML, the request may be for user interface data and the request is routed to a user interface mapper object 352 of the appropriate mapper object group. Similarly, if the request is a remote function call or a web services call, the request is routed to a remote function call mapper object 350 and a web services mapper object 354, respectively.

However, not all embodiments need include mapper object 312 groups and even some embodiments that include mapper object 312 groups may include one or more mapper objects outside of a group. For example, a mapper object may be included in some embodiments that is implemented as a DOP 351 of a hybrid object in concert with the SSOP 339. Further, some mapper objects, such as mapper object 350, may be or include a DOP 351.

Each mapper object 312 may execute to perform different functions. These functions of each mapper object 312 may include transforming data between the data interchange protocol of the app and a format of a connector object 320 associated with the particular mapper object 312 and vice versa. These functions may further include, when receiving a data request from the web server 308, forwarding transformed data of a data request to the connector object 320 associated with the particular mapper object 312. The functions of each mapper object 312 may further include, when receiving data from a connector object 320, forwarding transformed data received from the respective associated connector object 320 to the web server 308 for communication back to the requesting app 302. However, when a communication is received from an app, such as app 302, for the DOP 351, the communication may already be encoded by the app according to a data interchange format of a connector object 320 or an enterprise layer 330 interface 332, 334, 336. In such embodiments, the DOP 351 may receive the request and simply relay the request to a connector object 320 or an enterprise layer interface 332, 334, 336 without any further processing.

Connector objects 320 execute to process data requests forwarded by object mappers, such as the DOP 351, and data received in response to data requests forwarded to the enterprise layer 330, such as to the SSOP 339, via the interfaces 332, 334, 336. Each connector object 320 is executable to transform data between the format of the respective connector object 320 and at least one data interchange protocol of an interface of the enterprise layer 330, when such a transformation is needed. Each of the connector objects 320 is further executable to forward transformed data of a data request received from a mapper object 312, such as the DOP 351, to an interface 332, 334, 336 of the enterprise layer 330. The connector objects 320 are also executable to forward data received from an interface 332, 334, 336 of the enterprise layer 330 to an appropriate mapper object 312, such as DOP 351, from which the data request at the connector object 320 was received.

Due to the flexible nature of how mapper objects 312 and connector objects 320 can be associated, the web framework 310 of the system 300 allows for easy addition of new mapper objects 312 and connector objects 320 to meet evolving needs of an organization. For example, if a new app 302 is to be deployed that will access at least some of one or both of functionality and data of the enterprise layer 330, one or more new mapper objects 312, including one or more DOPs 351, may be defined and associated with appropriate connector objects 320 for the new app. Further, in the event of a change to one of the interfaces 332, 334, 336 of the enterprise layer 330, it is unlikely the mapper objects 312, which may include one or more DOPs 351, will need to be changed. Instead, the needed modifications would be made to the connector objects 320. Similarly, if a change is made to the app 302 that impacts data communicated from or to the app 302, typically only the relevant mapper objects 312 of a mapper object 312 group 314, 316, 318 would need to be modified, which may be limited to or include one or more DOPs 351. In addition, if a change is made to the functionality or master data within the enterprise layer 330 that is accessed by apps via a hybrid object, the change does not need to be replicated to the apps. Instead, such changes that might affect the hybrid objects can typically be made only in the SSOP 339 of the hybrid object. Thus, changes to certain portions of the system 300 can be effected rapidly and without significant impact on other portions of the system 300.

In an example embodiment, the app 302 may submit a request for data and functionality of the enterprise layer 330 via the network 304 to the web server 308. The request may originate with the app 302 but include a call of a hybrid object method exposed by the DOP 351 in the web framework 310 to the app 302. In some embodiments, the web server 308, upon receipt of the request from the app 302, may identify that the request is received from a particular app 302 and encoded according to an application protocol such as a remote function call (RFC) protocol. In such embodiments, based on one or more of the particular app 302, the particular data format, and a target destination of the request, the web server 308 may forward the request to a particular group 314 of mapper objects 312 within the web framework 310 that includes a particular DOP 351. In other embodiments, the web server 308 may determine, based on a URI of the request or data included therein, that the request is with regard to a server-side object portion in the enterprise layer 330 that is accessible via a particular DOP 351. The web server 308 may then forward the request from the app 302 to the web framework 310 to route to the appropriate DOP 351.

In this example, assuming the request is an RFC request, the request may be forwarded to the RFC mapper object 350, which is or includes the DOP 351, of the mapper object 312 group 314. The DOP 351 will then process the request, which typically includes minimal, if any, processing as the request from the app 302 will typically have already been encoded in a suitable format for relay by the DOP 351. The DOP 351 will then forward the request to an appropriate connector object 320, which in this case is RFC connector object 324. The RFC connector object 324 then retransmits the request to the enterprise layer 330. The RFC connector object 324, upon receipt of the request, may perform a transformation of the request into a format of the remote function module (RFM) 332 of the enterprise layer 330 and communicate the request thereto. However, a transformation may not need to be performed in some embodiments, such as when the request is originally transmitted by the app 302 in an appropriate format or a portion of the request is formatted accordingly and can be extracted from the original request and retransmitted.

The request when received by the RFM 332 of the enterprise layer 330 forwards the request to the SSOP 339, which then causes the request to be processed by the business logic 338. In some embodiments, when the request includes a data creation, update, or deletion request, regardless of what type of data edits may have been applied to the data of the request prior to submission by the app 302, the business logic or other portions of the enterprise layer 330 will perform edits on the data to ensure compliance with any data constraints, requirements, or other rules. By performing such edits on the data in the business logic 338 of the enterprise layer, the functionality of the edits need not be replicated or maintained in the app 302. The SSOP 339, upon completion of processing the request, will typically respond to the request app 302, via the DOP 351, with the request data. The request data may be, or include, a confirmation of one or more data processing activities performed, requested data, and other data or content depending on the particular request. The response may be communicated by the SSOP 339 from the enterprise layer 330 via the RFM interface 332 to the RFC connector object 324.

The RFC connector object 324, upon receipt of the response to the request from the enterprise layer 330, may then transform the received response from the format of the RFM interface 332 to a format of the RFC mapper object 350, such as the DOP 351, and send the transformed response thereto. The RFC mapper object 350 may then transform the response into a format of the client object portion 303, if any such transformation is needed, and transmit the transformed response either directly to the client object portion 303. However, in some embodiments, the various communications between the app 302, mapper objects 312 such as the DOP 351, connector objects 320 and interfaces 332, 334, 336 need not be transformed as the data to be carried over the network may originate in a format consumable by the target of the communicated data, whether the target be the SSOP 339 or the app 302. In such instances, the connector objects 320 and interfaces 332, 334, 336 essentially exist as preconfigured nodes in the data communication path utilized by hybrid objects to expose data and functionality of the enterprise layer 330 to the app 302.

Figure 4:
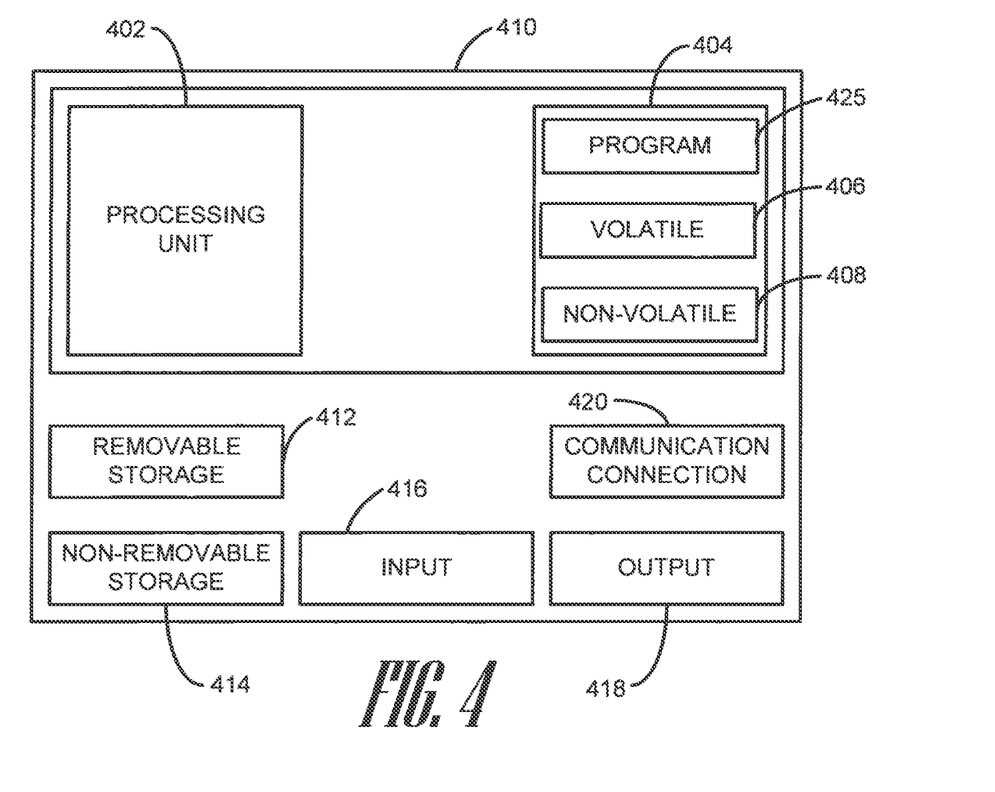
FIG. 4 is a block diagram of a computing device, according to an example embodiment.

FIG. 4 is a block diagram of a computing device, according to an example embodiment. The computing device is an example of a computing device upon which one or more of the embodiments described herein can be performed. Some embodiments may include multiple of such computing devices, such as at least one computing device for each of an app, a web platform, and an enterprise layer.

In one embodiment, multiple such computer systems are utilized in a distributed network to implement multiple components in a transaction-based environment. An object-oriented, service-oriented, or other architecture may be used to implement such functions and communicate between the multiple systems and components. The computing device may be in the form of a personal computer, a server-class computer, a smartphone, a controller of a device such as a set top box, a tablet computer, or other computing device. One example computing device in the form of a computer 410, may include a processing unit 402, memory 404, and non-removable storage 414. The computing device in some embodiments may also include removable storage 412. Memory 404 may include volatile memory 406 and non-volatile memory 408. Computer 410 may include—or have access to a computing environment that includes—a variety of computer-readable media, such as volatile memory 406 and non-volatile memory 408, removable storage 412 and non-removable storage 414. Computer storage includes random access memory (RAM), read only memory (ROM), erasable programmable read-only memory (EPROM) & electrically erasable programmable read-only memory (EEPROM), flash memory or other memory technologies, compact disc read-only memory (CI) ROM), Digital Versatile Disks (DVD) or other optical disk storage, magnetic cassettes, magnetic tape, magnetic disk storage or other magnetic storage devices, or any other medium capable of storing computer-readable instructions. Computer 410 may include or have access to a computing environment that includes input 416, output 418, and a communication connection 420. The computer may operate in a networked environment using a communication connection to connect to one or more remote computers, such as database servers. The remote computer may include a personal computer (PC), server, router, network PC, a peer device or other common network node, or the like. The communication connection may include a Local Area Network (LAN), a Wide Area Network (WAN) or other networks.

Computer-readable instructions stored on a computer-readable medium are executable by the processing unit 402 of the computer 410. A hard drive, CD-ROM, other optical mediums, flash memory device, and RAM are some examples of articles including a computer-readable medium. For example, a computer program 425 including executable instructions for performing one or more of the methods and other embodiments illustrated and described herein may be included on a CD-ROM, external hard disk, flash memory drive, or other non-transitory computer readable medium and loaded therefrom to a hard drive or other internal data storage or memory device.

Figure 5:
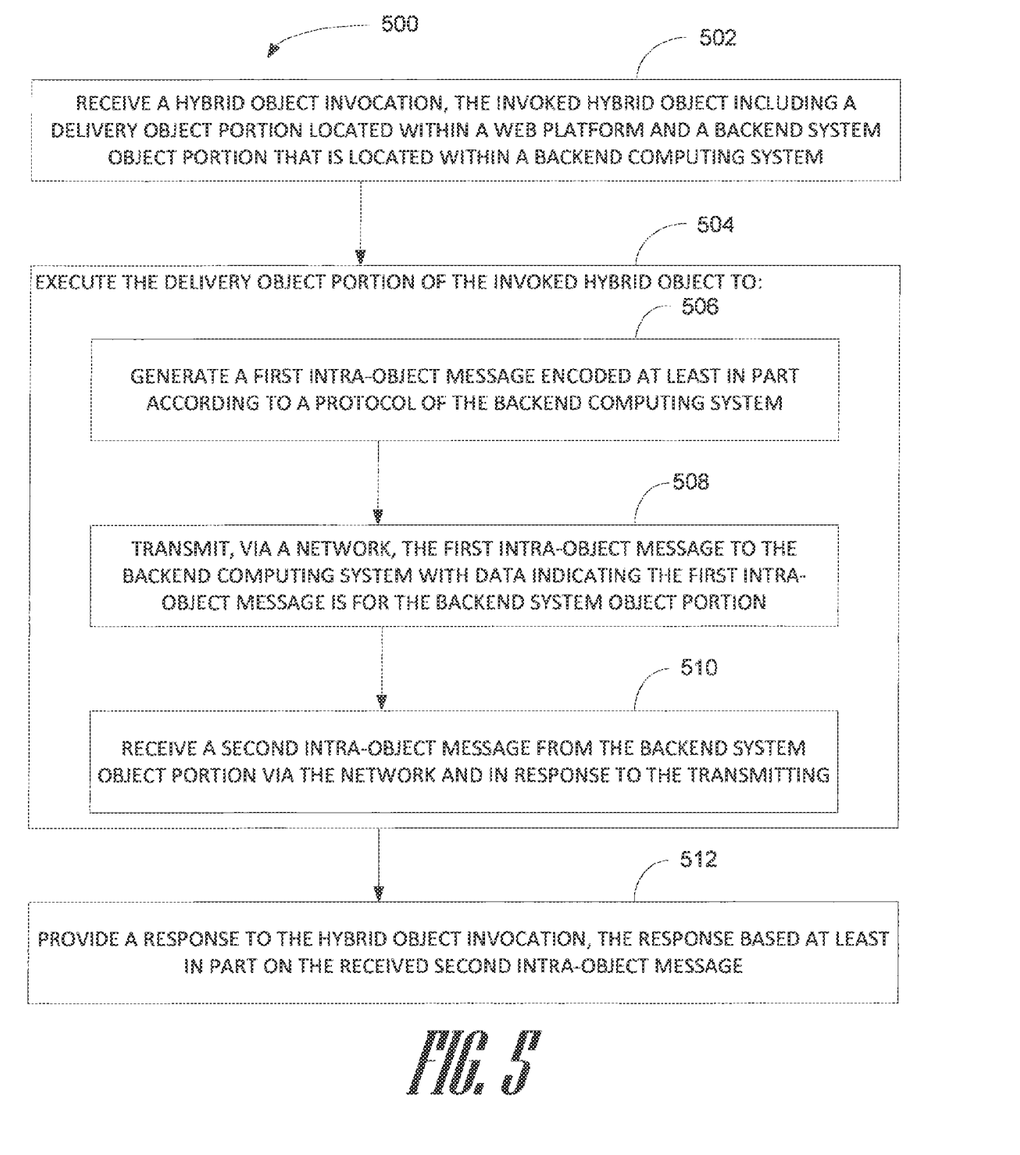
FIG. 5 is a block flow diagram of a method, according to an example embodiment.

FIG. 5 is a block flow diagram of a method 500, according to an example embodiment. The method 500 is an example of a process performed within a web platform including a delivery object portion of a hybrid object. The method 500 includes receiving 502, via a network, a hybrid object invocation of a hybrid object including a delivery object portion located with the web platform and a backend system object portion (also referred to herein as a server-side object portion) located within a backend computing system. The hybrid object invocation may be received 502 from one or more of various sources, such as a mobile device app, a process that executes to provide hosted access to an enterprise class computing system, a think client application, and the like.

The method 500 further includes executing 504, on a processor of a computing device on which the web platform operates at least in part, the delivery object portion of the invoked hybrid object. The executing 504 of the delivery object portion, in some embodiments, includes generating 506 a first intra-object message encoded at least in part according to a protocol of the backend computing system. Such a protocol may be a protocol for making remote function calls, a standards-based, lightweight data interchange format protocol, or other protocol. The executing of the app object portion in such embodiments further includes transmitting 508, via a network, the first intra-object message to the backend computing system with data indicating the first intra-object message is for the backend system object portion. The executing 504 of the app object portion in such embodiments additionally includes receiving 510 a second intra-object message from the backend system object portion via the network and in response to the transmitting 508. The method 500 may then provide 512 a response to the hybrid object invocation based at least in part on the received second intra-object message. The response to the hybrid object invocation generally includes transmitting at least a portion of the second intra-object message to a location or process from which the hybrid object invocation was received 502.

In some embodiments, receiving 502 the hybrid object invocation includes receiving a hybrid object method call, the logic of the called hybrid object method being executable within the backend computing system. The hybrid object method call in some embodiments is received 502 in response to input received in a mobile device app or mobile device process. In these and other embodiments of the method 500, receiving 502 the hybrid object invocation includes receiving a hybrid object method call of an object method present-in-part in the delivery object portion as a hybrid object method stub. Such a hybrid object method stub may be executable to receive the hybrid object method call and invoke the executing of the hybrid object method stub. The hybrid object method in such embodiments is present-in-part in the backend system object portion and includes a data processing functional core of the hybrid object method.

In some embodiments of the method 500, transmitting 508 the first intra-object message to the backend computing system includes transmitting the first intra-object message to the backend computing system via a web server process. Such a web server process receives the first intra-object message and retransmits at least a portion of the first intra-object message to the backend system.

In some further embodiments of the method 500, generating 506 the first intra-object message encoded at least in part according to the protocol of the backend computing system includes encoding at least the portion of the first intra-object message to be retransmitted by the web server process according to the protocol of the backend computing system. The web server process in such embodiments does not need to perform a translation function on the portion of the first intra-object message before retransmitting the first intra-object message to the backend system.

Figure 6:
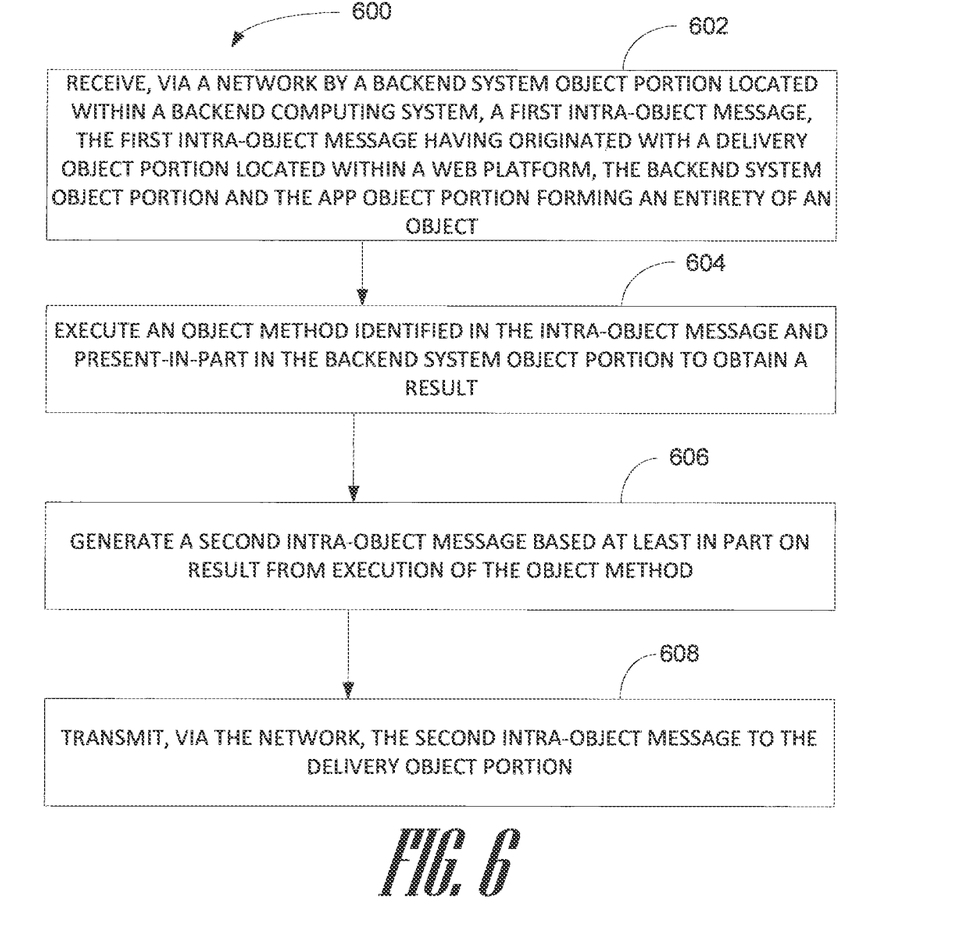
FIG. 6 is a block flow diagram of a method, according to an example embodiment.

FIG. 6 is a block flow diagram of a method 600, according to an example embodiment. The method 600 is an example of a process performed within an enterprise-class computing system, such as an ERP system, including a backend (server-side) object portion of a hybrid object.

The method 600, in some embodiments, includes receiving 602, via a network by a backend system object portion located within a backend computing system, a first intra-object message. The first intra-object message in such embodiments will have originated with a delivery object portion located within a web platform, such as in response to a hybrid object invocation received by the web platform from a mobile device app. The backend system object portion and the delivery object portion together form the hybrid object. The method 600 further includes executing 604 a hybrid object method identified in the intra-object message and present-in-part in the backend system object portion to obtain a result. Based at least in part on the result, the method 600 includes generating 606 a second intra-object message and transmitting 608, via the network, the second intra-object message to the delivery object portion.

In some such embodiments of the method 600, the hybrid object method of the hybrid object exists in part in both the backend system object portion and the delivery object portion. The delivery object portion of the hybrid object method typically is a hybrid object method stub. The hybrid object method stub in the delivery object portion is executable to receive a hybrid object method call, such as from an app, and to invoke executing of the hybrid object method stub to cause the call of the hybrid object method to be transmitted to the backend system object portion in the first intra-object message In some embodiments of the method 600, the generating 606 of the second intra-object message includes encoding at least a portion of the second intra-object message according to a protocol of the delivery object portion, or at least a protocol for which the delivery object portion includes functionality to process. For example, the protocol may be one or more of ASCII text, HTML, XML, Java Script Object Notation (JSON), a remote function call protocol, or other lightweight open standard data interchange protocol. In some such embodiments, the transmitting 608 of the second intra-object message to the delivery object portion may include transmitting the second intra-object message to the delivery object portion via a connector object tailored to communicate according to a communication protocol of the backend computing system.

Another embodiment is in the form of a system that includes a network and a web server infrastructure. The network may include wired and wireless connections carrying data of one or more network types. Such network types may include the Internet, a local area network, a wireless telephone network capable of transporting data, a wide area network, a value added network, a system area network, and a virtual private network, among others. The web server infrastructure is coupled to the network and includes a proxy service that operates thereon to receive and forward intra-object messages over the network and between a delivery object portion and a backend system object portion of a hybrid object. The delivery object portion and the backend system object portion forming an entirety of the hybrid object. In such embodiments, the proxy service and other services within the web server infrastructure generally do not perform any translation functions upon intra-object messages between the delivery object portion and the backend system object portion of the hybrid object. The system may further include a mobile computing device storing an app that executes thereon. The app is executable on the mobile computing device, in response to input received by an app process, to call methods of the hybrid object. The calling of hybrid object methods, in some embodiments, includes transmitting, via the network, a hybrid object method invocation command to the delivery object portion on the web server infrastructure.

In some embodiments, the delivery object portion is executable by a processor of the web server infrastructure, in response to a method call received from the mobile computing device. The deliver object in such instances is executable to generate a first intra-object message encoded at least in part according to a protocol of a backend computing system upon which the backend system object portion executes. The first intra-object message includes the call of the hybrid object method that exists within the backend system object portion. The delivery object portion then transmits the first intra-object message to the backend computing system over the network and via the proxy service with data indicating the intra-object message is for the backend system object portion. The delivery object portion may then receive, in response to the first intra-object message, a second intra-object message from the backend system object portion over the network and via the proxy service and then provide a response to the app on the mobile computing device based at least in part on the second intra-object message. The backend computing system in such embodiments is executable on the backend system to receive the first intra-object message from the deliver object portion and execute the hybrid object method identified therein to obtain a result. Based at least in part on the result from execution of the hybrid object method, the backend system object portion may then generate and transmit the second intra-object message to the delivery object portion over the network and via the proxy service. It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

What is claimed is:

1. A method comprising:
  receiving, via a network, a hybrid object invocation from a client app, the invoked hybrid object including a delivery object portion located within a web platform and a backend system object portion located within a backend computing system; and
  on a processor of a computing device on which the web platform operates at least in part, executing the delivery object portion of the invoked hybrid object, the executing of the delivery object portion including:
    generating a first intra-object message encoded at least in part according to a protocol of the backend computing system, the generating of the first intra-object message including:
      selecting a mapper object group based on the client app from which the hybrid object invocation was received;
      selecting a mapper object from the selected mapper object group based on a type of data to be communicated to the backend system;
      processing the hybrid object invocation with the selected mapper object to transform at least a portion of the received hybrid object invocation into a form compatible with a connector object configured to communicate via one of a plurality of backend system interfaces, the connector object identified based on the type of data to be communicated to the backend system;
      processing the hybrid object invocation with the identified connector object to transform the hybrid object invocation from the form received from the selected mapper object into the first intra-object message of a form compatible with the backend system interface with which the connector object is configured to communicate;
    transmitting, by the connector object via the network, the first intra-object message to the backend computing system with data indicating the first intra-object message is for the backend system object portion;
    receiving a second intra-object message from the backend system object portion via the network and in response to the transmitting; and
    providing, via the network, a response to the hybrid object invocation, the response based at least in part on the received second intra-object message.

2. The method of claim 1, wherein receiving the hybrid object invocation includes receiving a hybrid object method call, the logic of the called hybrid object method being executable within the backend computing system.

3. The method of claim 1, wherein:
  receiving the hybrid object invocation includes receiving a hybrid object method call of a hybrid object method present-in-part in the delivery object portion as a hybrid object method stub to:
    receive the hybrid object method call; and
    invoke the executing of the hybrid object method stub; and
  the hybrid object method present-in-part in the backend system object portion and includes a data processing functional core of the hybrid object method.

4. The method of claim 1, wherein the protocol of the backend computing system is a standards-based, lightweight data interchange format protocol.

5. The method of claim 1, wherein transmitting the first intra-object message to the backend computing system includes transmitting the first intra-object message to the backend computing system via a web server process that receives the first intra-object message and retransmits at least a portion of the first intra-object message to the backend system.

6. The method of claim 5, wherein generating the first intra-object message encoded at least in part according to the protocol of the backend computing system includes:
  encoding at least the portion of the first intra-object message to be retransmitted by the web server process according to the protocol of the backend computing system, wherein the web server process does not need to perform a translation function on the portion of the first intra-object message before retransmitting the first intra-object message to the backend system.

7. A method comprising:
  receiving, via a network by a backend system object portion located within a backend computing system, a first intra-object message, the first intra-object message having originated with a delivery object portion located within a web platform, the backend system object portion and the delivery object portion forming an entirety of an object;
  executing an object method identified in the intra-object message and present-in-part in the backend system object portion to obtain a result;
  generating a second intra-object message based at least in part on result from execution of the object method;
  transmitting, via the network, the second intra-object message to the delivery object portion; and
  wherein:
    the object method of the object exists in part in both the backend system object portion and the delivery object portion;
    the delivery object portion of the object method includes an object method stub to:
      receive an object method call via a network from an app; and
      invoke the executing of the object method stub to cause the call of the object method to be transmitted to the backend system object portion in the first intra-object message including generation of the first intra-object message, the generating of the first intra-object message including:
        selecting a mapper object group based on the app from which the object method call was received;
        selecting a mapper object from the selected mapper object group based on a type of data to be communicated to the backend system;
        processing the object method call with the selected mapper object to transform at least a portion of the received object method call into a form compatible with a connector object configured to communicate via one of a plurality of backend system interfaces, the connector object identified based on the type of data to be communicated to the backend system;

processing the object method call with the identified connector object to transform the object method call from the form received from the selected mapper object into the first intra-object message of a form compatible with the backend system interface with which the connector object is configured to communicate; and transmitting, by the connector object, the call of the object method to the interface of the backend system.

8. The method of claim 7, wherein the generating of the second intra-object message includes encoding at least a portion of the second intra-object message according to a protocol of the web platform on which the delivery object portion executes.

9. The method of claim 8, wherein transmitting the second intra-object message to the delivery object portion includes transmitting the second intra-object message to the delivery object portion via a connector object present within the web framework, the connector object tailored to communicate according to a communication protocol of the backend computing system.

10. A non-transitory machine-readable storage medium, with instructions stored thereon which when executed by at least one processor of at least one computing device, cause the at least one computing device to:

receive, via a network, a hybrid object invocation from a client app, the invoked hybrid object including a delivery object portion located within a web platform and a backend system object portion located within a backend computing system; and on a processor of a computing device on which the web platform operates at least in part, execute the delivery object portion of the invoked hybrid object, the executing of the delivery object portion including:

generating a first intra-object message encoded at least in part according to a protocol of the backend computing system, the generating of the first intra-object message including:

selecting a mapper object group based on the client app from which the hybrid object invocation was received;

selecting a mapper object from the selected mapper object group based on a type of data to be communicated to the backend system;

processing the hybrid object invocation with the selected mapper object to transform at least a portion of the received hybrid object invocation into a form compatible with a connector object configured to communicate via one of a plurality of backend system interfaces, the connector object identified based on the type of data to be communicated to the backend system;

processing the hybrid object invocation with the identified connector object to transform the hybrid object invocation from the form received from the selected mapper object into the first intra-object message of a form compatible with the backend system interface with which the connector object is configured to communicate;

transmitting, by the connector object via the network, the first intra-object message to the backend computing system with data indicating the first intra-object message is for the backend system object portion;

receiving a second intra-object message from the backend system object portion via the network and in response to the transmitting; and providing, via the network, a response to the hybrid object invocation, the response based at least in part on the received second intra-object message.

11. The non-transitory machine-readable storage medium of claim 10, wherein:

receiving the hybrid object invocation includes receiving a method call of an object method present-in-part in the delivery object portion as an object method stub to:
receive the method call; and
invoke the executing of the method stub; and the method present-in-part in the backend system object portion and includes a data processing functional core of the object method.

12. The non-transitory machine-readable storage medium of claim 10, wherein the protocol of the backend computing system is a standards-based, lightweight data interchange format protocol.

13. The non-transitory machine-readable storage medium of claim 10, wherein transmitting the first intra-object message to the backend computing system includes transmitting the first intra-object message to the backend computing system via a web server process that receives the first intra-object message and retransmits at least a portion of the first intra-object message to the backend system.

14. The non-transitory machine-readable storage medium of claim 13, wherein generating the first intra-object message encoded at least in part according to the protocol of the backend computing system includes:

encoding at least the portion of the first intra-object message to be retransmitted by the web server process according to the protocol of the backend computing system, wherein the web server process does not need to perform a translation function on the portion of the first intra-object message before retransmitting the first intra-object message to the backend system.

* * * * *